(12) United States Patent
Wang et al.

(10) Patent No.: US 7,689,580 B2
(45) Date of Patent: Mar. 30, 2010

(54) SEARCH BASED APPLICATION DEVELOPMENT FRAMEWORK

(75) Inventors: Anping Wang, Redwood City, CA (US); David Chuen Chi Lam, Sunnyvale, CA (US); Avinash Dabholkar, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 389 days.

(21) Appl. No.: 11/277,585

(22) Filed: Mar. 27, 2006

(65) Prior Publication Data
US 2007/0226242 A1    Sep. 27, 2007

(51) Int. Cl.
*G06F 7/00* (2006.01)
*G06F 17/30* (2006.01)

(52) U.S. Cl. .................. 707/102; 707/104.1; 707/3; 707/7

(58) Field of Classification Search ........................ None
See application file for complete search history.

(56) References Cited

U.S. PATENT DOCUMENTS 6,393,423 B1 * 5/2002 Goedken ...................... 707/10
6,968,332 B1 * 11/2005 Milic-Frayling et al. ....... 707/3
6,999,956 B2 * 2/2006 Mullins .......................... 707/2
2007/0168336 A1 * 7/2007 Ransil et al. .................... 707/3

OTHER PUBLICATIONS

Sattler et al., "Concept-based querying in mediator systems," The VLDB Journal, 2005, vol. 14, pp. 97-111.
Aldana et al., "Bio-Broker: a tool for integration of biological data sources and data analysis tools," Software—Practice and Experience, 1006, vol. 36, pp. 1585-1604.
Aldana-Montes et al., "Solving Queries over Semantically Integrated Biological Data Sources," WADM, 2004, LNCS 3129, pp. 249-258.
Navas et al., "Towards Conceptual Mediation," ICEIS 2004—Databases and Information Systems Integration, pp. 169-176.

* cited by examiner

*Primary Examiner*—Jean M Corrielus
*Assistant Examiner*—Loan T Nguyen
(74) *Attorney, Agent, or Firm*—Aka Chan LLP

(57) ABSTRACT

Methods and apparatus for creating a search framework that provides a semantic interface for searching transactional applications are disclosed. According to one aspect of the present invention, a method for enabling at least one transactional application to be searched includes creating a canonical object associated with the transactional application and indexing data associated with the transaction application. The method also includes creating an index store using information associated with the canonical object. The index store is associated with the indexed data. Finally, a semantic engine is interfaced with the index store.

35 Claims, 10 Drawing Sheets

SEARCH BASED APPLICATION DEVELOPMENT FRAMEWORK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

SEQUENCE LISTING

Not Applicable

BACKGROUND OF THE INVENTION

1. Field of Invention

The present invention relates generally to allowing applications to be searched. More particularly, the present invention related to a framework which allows a user to search enterprise applications, and to perform actions using the results of a search.

2. Description of the Related Art

As the use of networks expands, the use of enterprise applications is becoming more prevalent. An enterprise application is generally a software application hosted on a server which has the capability of simultaneously providing services to a large number of users on a network. Often, an enterprise application is suitable for performing business-related functions. Business-related functions may include, but are not limited to, tracking customer information, accounting, and production scheduling.

Often, it is desirable to search for information such as information that may be stored in or otherwise associated with enterprise applications. By way of example, an enterprise application may contain within it information pertaining to the name of an account manager for a particular bank such as Bank XYZ in Australia. To answer a question or query such as "Who is the account manager for Bank XYZ in Australia?," there are generally three ways in which answers may potentially be obtained. FIG. 1 is a diagrammatic representation of queries that may be made for information associated with an enterprise application. When a client 118 or a requester desires an answer to a query regarding information 114 that may be included in an enterprise application 110, client 118 may formulate a natural language query 130. Natural language query 130 may be made to an entity 122 that potentially has access to information 114 such as a human being. Entity 122 may have access to information 114 within enterprise application 110, or entity 122 may have access to information 114 via other avenues. While natural language query 130 may be relatively easy to formulate, entity 122 may not necessarily have access to information 114. Hence, an answer to natural language query 130 may not necessarily be readily obtained from entity 122. Client 118 may need to query more than one entity before an answer is obtained. Therefore, querying via an entity 122 with access such as a human being is often inefficient and costly.

As enterprise application 110 stores data such as information 114, client 118 may formulate a SQL or form-based query 134 that accesses information 114 in enterprise application 110. In general, information 114 within enterprise application 110 may only be accessed if a developer of enterprise application 110 makes information 114 available to client 118 or other user. The formulation of SQL or form-based query 134 to access available information 114 is difficult, as information 114 may be stored at a low level within enterprise application 110. The internal structure of enterprise application 110 may be complicated and, often, proprietary. In many cases, client 118 may need to take training courses pertaining to enterprise application 110 before client 118 is able to successfully formulate SQL or form-based query 134. Formulating SQL or form-based query 134 may require significant development efforts. Hence, although information 114 is likely to be successfully obtained based on SQL or form-based query 134, the steps associated with creating SQL or form-based query 134 may be complicated and time-consuming.

A keyword based query 138 may be entered by client 118 into a search engine 126 to locate information 114. If information 114 is the name of an account manager for Bank XYZ in Australia, keyword based query 138 may include the words "account," "manager," "XYZ," and "Australia." The use of search engine 126 may be relatively fast and efficient if information 114 is accessible. However, if information 114 turns out not to be available to search engine 126, i.e., if information 114 is not included in a document, file, or application that is accessible to search engine 126, then client 118 will not get satisfactory results to keyword based query 138. Information 114 may also not be available if it is stored in tables that are transactional, i.e., that contain descriptive fields for viewing but are not indexed for searching. Search engine 126 is substantially only capable of presenting search results that may be read by client 118. In other words, when results to keyword based query 138 are presented to client 118, the results are presented such that client 118 may read the results but generally may not act upon the results without a significant developmental effort.

Though a natural language query 130 and a keyword based query 138 may be effective in enabling client 118 to obtain information 114, natural language query 130 may be inefficient, and natural language query 130 and keyword based query 138 may not always provide client 118 with information 114, e.g., when information 114 is unavailable to entity 122 and to search engine 126. Further, as information 114 may not be accurate, if it is not obtained substantially directly from enterprise application 110 which uses information 114. In general, client 118 may successfully gain access to information 114 which is accurate via enterprise application 110. Such information 114 is at least as accurate as enterprise application 110. However, as mentioned above, forming a SQL or form-based query 134 is typically complicated.

Therefore, what is needed is a method and an apparatus which enables information stored in enterprise application to be readily searched. That is, what is desired is a system which allows a user to search enterprise applications in a structured manner for accurate information.

BRIEF SUMMARY OF THE INVENTION

The present invention relates to a searching framework that provides a semantic interface for searching transactional applications. According to one aspect of the present invention, a method for enabling at least one transactional application to be searched includes creating a canonical object associated with the transactional application and indexing data associated with the transaction application. The method also includes creating an index store using information associated with the canonical object. The index store is associated with the indexed data. Finally, a semantic engine is interfaced with the index store.

In one embodiment, a query is provided to the semantic engine in a first format. In such an embodiment, the semantic engine translates the query from the first format into a second format associated with a search engine before the index store is accessed using the search engine.

A development framework for search based applications that enables semantic or other information to be used to search applications allows data associated with the applications to be obtained relatively efficiently. As such a development framework may utilize substantially any search engine, the performance of a search engine may be leveraged. In general, the development framework includes an interface which enables a search engine to access information stored within an application, and provides the information to an end user who may then perform actions directly on the information. By providing a toolkit that includes the interface and a semantic engine for translating queries from natural language-based string into strings that may be used to search an application, a developer may create an overall system that allows applications to be searched with relatively little developmental effort.

According to another aspect of the present invention, a framework for enabling at least one application to be searched includes an interface, a pluggable search engine, and a runtime manager. The interface translates a query from a first format to a second format, and is associated with a canonical business object related to the application. The search engine searches the application in response to the query, and the runtime manager interfaces the search engine with the application and causes a result of the query to be displayed. In one embodiment, the application is an enterprise application, a transactional application, or a transactional enterprise application.

In another embodiment, a designer may be used by a developer to create meta data which includes canonical objects, their categories, and semantic definitions for the objects. The interface may include user interface renderers, an action controller, and a semantic engine. In such an embodiment, the runtime manager may interact with the search engine to perform crawling, indexing, and monitoring.

In accordance with still another aspect of the present invention, a method for processing a query that requests information associated with an application involves selecting a canonical business object associated with the application, and performing a search using information associated with the query. The search is associated with the canonical business object. Performing the search includes utilizing an index store containing information associated with the application. The method also includes obtaining a result of the search from the index store. In one embodiment, the result is a web link that allows direct access to the application.

These and other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE INVENTION

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

Searches for unstructured or demoralized data associated with enterprise applications are generally not readily available to end users. Although some search applications are available, those search applications generally require significant developmental efforts on the part of the end user before specific enterprise applications may be searched.

Augmenting existing search engines, and creating a framework that incorporates existing search engines, such that transactional applications may be searched by end users who provide natural language queries would allow end users to relatively efficiently search enterprise applications. In one embodiment, a developer may be provided with a toolkit that may be used to develop software modules needed to interface a particular enterprise application with a framework that incorporates existing search engines. The toolkit may be used to develop a search based application that may be used to search enterprise applications or transactional applications. The use of such a toolkit allows the functionality of high performance search engines to be leveraged to search any number of enterprise or transactional applications, substantially without requiring significant development efforts on the part of a developer.

Creating a junction point between search engines and enterprise applications allows information that an end user can act on to be obtained. Further, searches for many different types of information may be implemented. By way of example, searches for transactional records, work items, programming bugs, and other business-related elements may be performed with accuracy.

Figure 1:
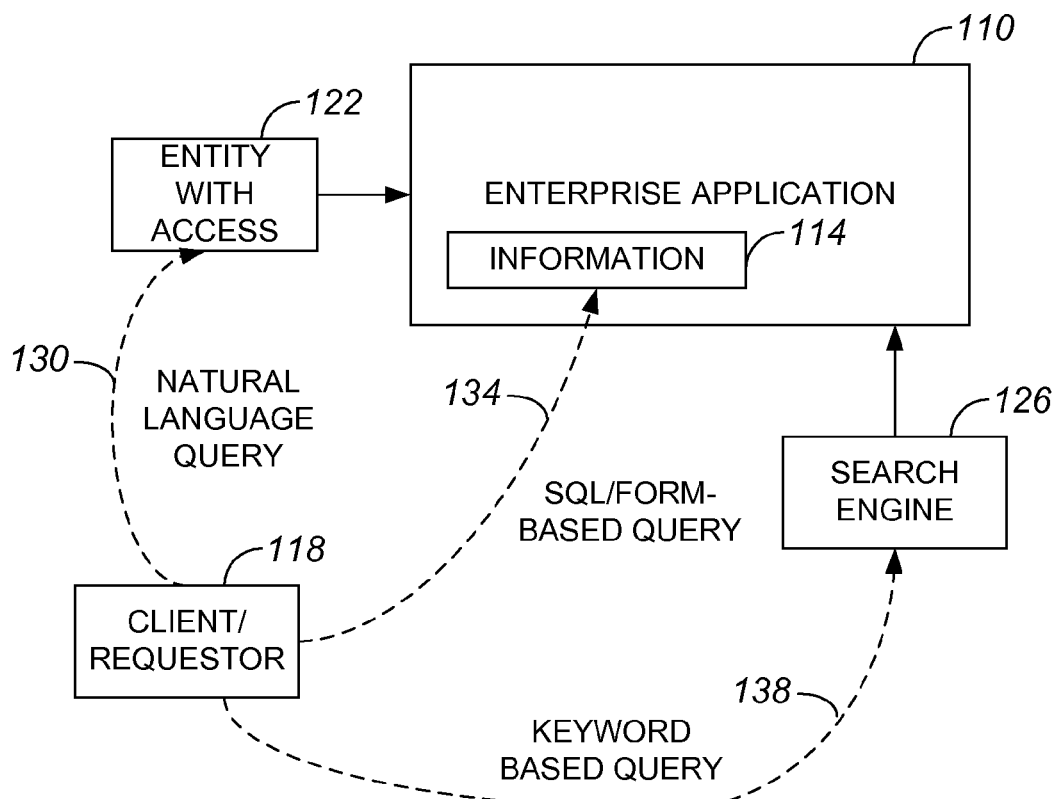
FIG. 1 is diagrammatic representation of queries that are made for information associated with an enterprise application.
Figure 2:
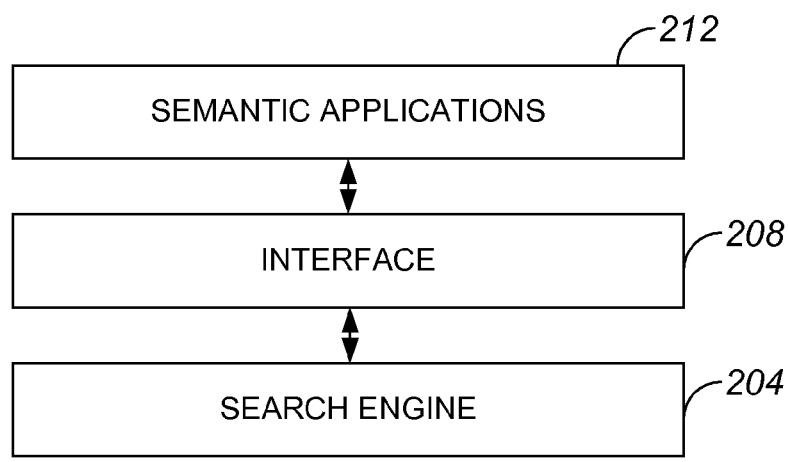
FIG. 2 is a block diagram representation of a system in which an interface between a search engine and applications allows the applications to be searched in accordance with an embodiment of the present invention.

FIG. 2 is a block diagram representation of a system in which an interface between a search engine and applications allows the applications to be searched in accordance with an embodiment of the present invention. A search engine 204, which may be substantially any suitable search engine, may be used to search applications 212 through an interface 208. Applications 212 may be enterprise applications such as transactional applications, i.e., applications that utilize transactions, although it should be appreciated that applications 212 may be widely varied. In one embodiment, search engine 204 may be a SQL search engine, an open source based search engine such as Apache Lucene, or an Oracle Text search engine available from Oracle Corporation of Redwood Shores, Calif.

Interface 208 is arranged to enable a query that is made via search engine 204 to search applications 212 for results that effectively match the query. That is, interface 208 effectively serves as a junction between search engine 204 and applications 212 such that search engine 204 may search information associated with, e.g., contained in, applications 212. By way of example, applications 212 may include an application in which customer information is stored in an associated database. Interface 208 may enable that application to be searched for the customer information using search engine 204 and a query such as "Who is the account manager for John Doe's account at Bank XYZ in California?"

Figure 3:
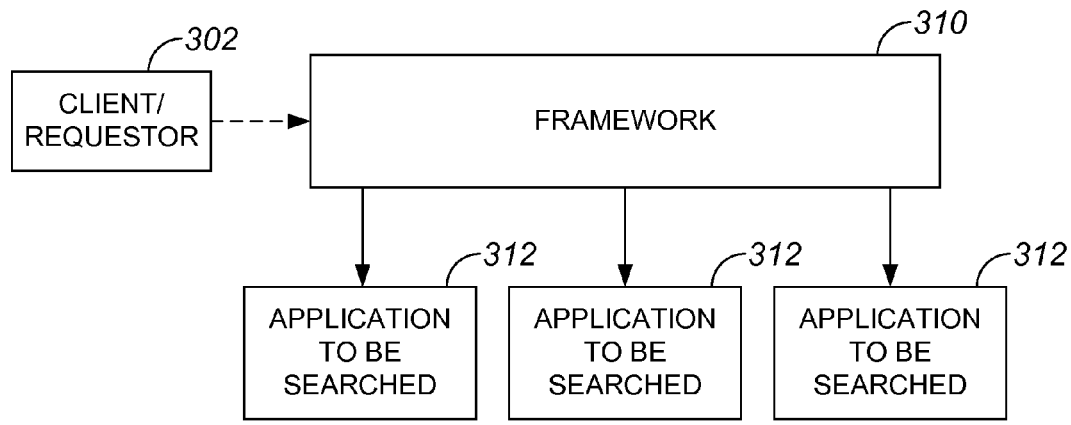
FIG. 3 is a block diagram representation of a framework that allows a client to search a plurality of applications in accordance with an embodiment of the present invention.

In general, an overall framework which includes a search engine and an interface that cooperate to allow applications to be searched may be arranged to accept a query and to provide a response to the query. FIG. 3 is a block diagram representation of a framework that allows a client to search a plurality of applications in accordance with an embodiment of the present invention. A framework 310 generally include functionality needed to enable applications 312 to be searched once a client 302 enters a query into framework 310. Applications 312 may be transactional applications, while the query entered into framework 310 may be implemented into a semantic application (not shown) associated with framework 310. Framework 310 may generally translate the query, e.g., from natural language into a query that is understood by a search engine (not shown) included in framework 310, and then search applications 312 based on the translated query. Any results from the translated query may be presented to client 302 using framework 310.

Figure 4:
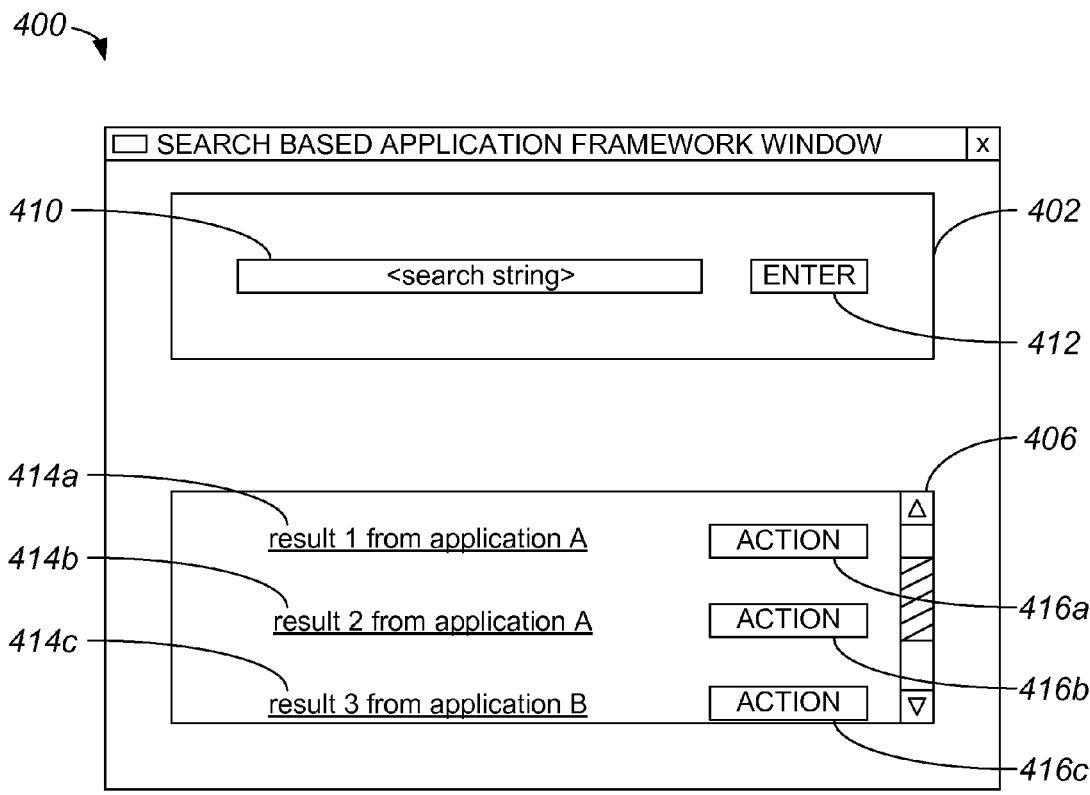
FIG. 4 is a diagrammatic representation of a display window with a search query area and a results area that enables actions to be taken in accordance with an embodiment of the present invention.

When results of a query a presented, the results may be displayed on a display screen of a computing system associated with client 302. In one embodiment, a display screen may include a search area into which a query is entered and displayed, as well as a results area in which results are displayed after a search is performed based on the query. With reference to FIG. 4, one display window that provides a user interface for entering a query and a user interface associated with displayed results will be described in accordance with an embodiment of the present invention. A display window 400, which may be a browser window for a web-based application, includes a query area 402 and a results area 406. Query area 402 includes a field 410 into which a search string may be entered, e.g., by a user using a keyboard input. It should be appreciated that field 410, though shown as suitable for accepting text input, may also be populated using other methods. Other methods include, but are not limited to, providing input using pull-down or pop-up menus.

Once a search string is entered into field 410, an enter button 412 may be pressed or clicked to commence a search. Pressing enter button 412 generally begins a process of effectively invoking a framework such as framework 310 of FIG. 3 to search at least one application for an answer associated with the search string. When a search is completed, results 414a-c may be displayed in results area 406. Although three results 414a-c are shown, it should be appreciated that the number of results 414a-c to a query may vary widely.

Results 414a-c may come from any applications which are searched. As shown, result 414a and result 414b are associated with an application 'A,' while results 414c is associated with an application 'B.' In the described embodiments, results 414a-c are links which may be selected, and which upon selection may open a display window for the application with which a link is associated. By way of example, if result 414a is selected, a display window may open that is associated with application 'A' and displays the result of the query as located in application 'A.'

Results 414a-c may have associated action buttons 416a-c, respectively. It should be appreciated, however, that not all results 414a-c may generally have an associated action button 416a-c. By selecting an action buttons 416a-c, an action may be taken with respect to a corresponding result 414a-c. In one embodiment, selecting action buttons 416a-c may cause a user to be redirected to a transactional application form a semantic application with which display window 400 is associated. For instance, if a search string entered into field 410 is for a search pertaining to a job description, then results 414a-c may include job openings that match the job description. In such a case, action buttons 416a-c may be buttons which, when selected, cause a user to apply for the job openings using an associated transactional application, e.g., clicking on action button 416a may cause a user to apply for a job opening associated with result 414a.

Field 410 may accept search strings associated with different search categories. In one embodiment, search categories may include a people search category, a worklist search category, and an integration repository search category. A people search category may allow a client or a user to search for a person such as a customer or an account manager in a business application in which customer or account manager information is stored in a database of a trading community model. For a people search, results 414a-c may include names of account managers. A worklist search category may allow a client or a user to search for personal action items that are assigned within an organization as a result of a business process. For a worklist search, results 414a-c may include a list of work or action items for the user. An integration repository search category may allow a client or a user to locate an application programming interface (API) that may be used to integrate various third-party programs or applications. For an integration repository search, results 414a-c may be a list of APIs that are available to third-party integrators.

Figure 5A:
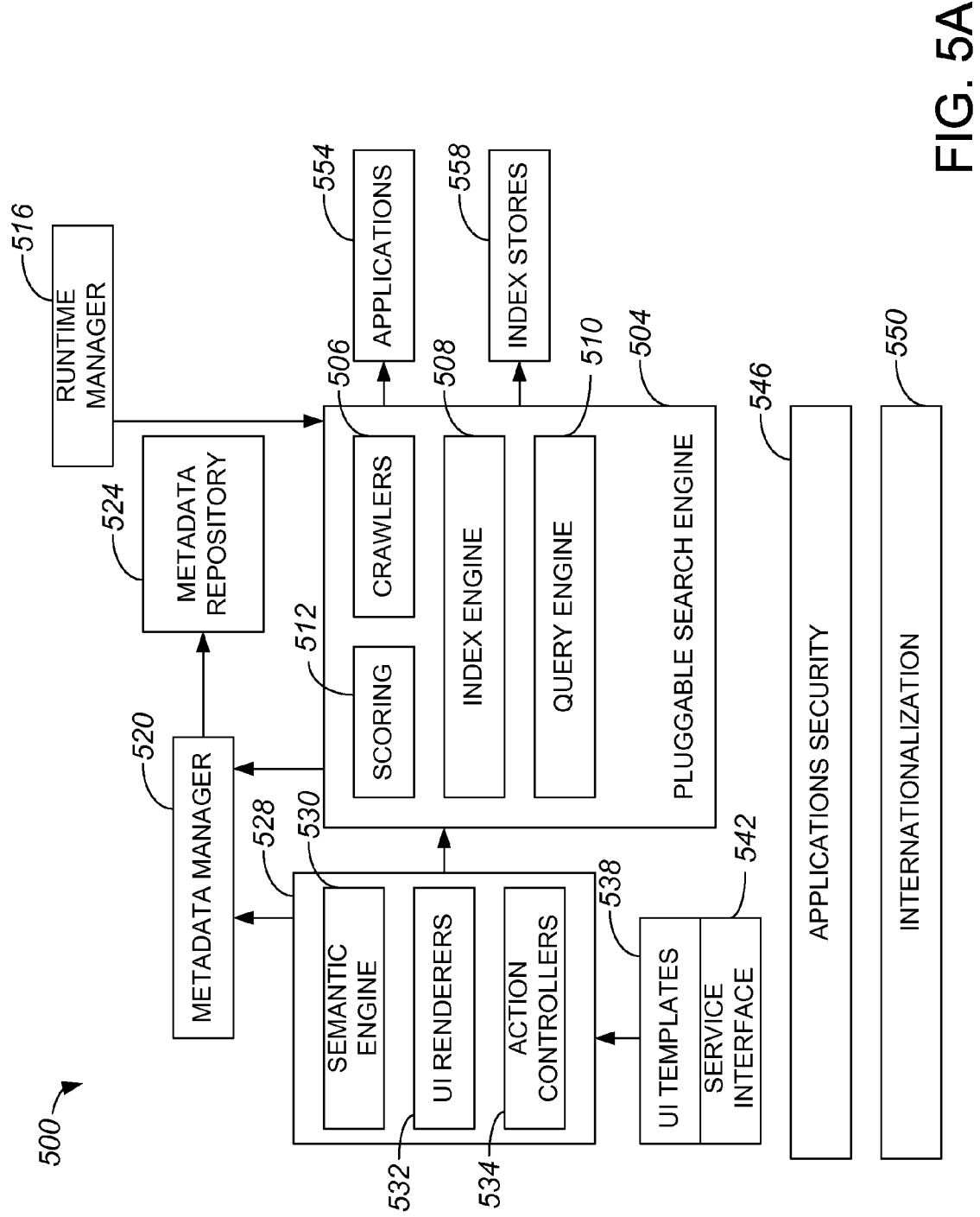
FIG. 5A is a block diagram representation of a basic software architecture which allows applications to be searched in accordance with an embodiment of the present invention.

To provide a framework such as framework 310 of FIG. 3, substantially standard search engines may be incorporated. A toolkit may be provided for use by developers to integrate applications with a framework. Within the toolkit, a user interface for managing search categories may be provided, along with APIs for developers to use to develop custom modules. Such a toolkit may also provide a runtime manager that allows for a search engine to be interfaced with the framework. Developers may generally use the toolkit to define search categories. FIG. 5A is a block diagram representation of components that are associated with a search based application architecture in accordance with an embodiment of the present invention. An architecture 500, which may be considered to be an overall search toolkit, utilizes a search engine 504. Architecture 500 is arranged to enable category searches to be performed. Search engine 504 is pluggable, and may be substantially any search engine with an API. In general, search engine 504 is pluggable in that search engine 504 allows components such as crawlers 506, an index engine 508, a query engine 510, and a scorer 512 to be interfaced therein.

Crawlers 506 are arranged to crawl a source, as will be understood by those skilled in the art. Crawlers 506, in one embodiment, provide functionality to crawl substantially all applications 554, as for example enterprise applications and/or transactional applications, which are to be searched. The construction of searchable documents for a canonical business object definition, as well as the construction of runtime application data, occurs using crawlers. A Java Database Connectivity (JDBC) API is a standard SQL database access interface on which crawlers 506 may be based.

Index engine 508 generally indexes a searchable document constructed by crawlers 506, and is arranged to expose index stores 558 to query engine 510. Index stores 558 are locations at which indexes are stored. Settings such as security settings associated with index stores 558 may be managed by a runtime manager 516. Runtime manager 516 us also arranged to allow a search to be managed at runtime, as for example such that crawling may be scheduled and index stores 558 may be set up.

Query engine 510, which may be considered to be a query builder, is a software module that is used within architecture 500 to perform searches in pre-crawled index stores 558. Query engine 510 uses metadata obtained from a metadata repository 524 via a metadata manager 520 to effectively convert a user entered query from a query understood by search engine 504 into a query that is understood by index stores 558. Metadata repository 524 stores substantially all meta data, and also stores object categories and semantic definitions. Metadata manager 520 manages meta data, and provides a user interface for creating, modifying, and deleting search categories. In one embodiment, business objects may be stored in metadata repository 524, while search categories are stored by metadata manager 520.

Scorers 512 provide rating functionality. While search engine 504 generally has scoring functionality, scorers 512 may be used to augment or to alter the scoring functionality included in search engine 504. In general, each scorer 512 may be associated with a particular search category, and may provide information relating to how much of a match a particular result is to a query.

An interface component 528 that is in communication with search engine 504 includes a semantic engine 530, user interface renderers 532, and action controllers 534. Semantic engine 530 is a query builder that is arranged to translate a user query into a query that is understood by search engine 504. That is, semantic engine 530 may convert queries based on metadata stored in meta data repository 524. In one embodiment, semantic engine 530 translates a natural language based query into a search engine specific query. By way of example, a user query of "Who reports to Jane Doe?" may be translated into a search engine specific query such as "mgrFirstname:Jane, mgrLastname:Doe" based on semantic information assigned to the appropriate fields.

User interface renderers 532 are arranged to enable results of a query or a search to be displayed. That is, user interface renderers 532 allow user interface representations of a given search category to be produced and rendered to a user. One user interface renderer 532 may be arranged to display results in a table. In general, user interface renderers 532 may be assigned to a given type of canonical business object.

Action controllers 534 are arranged to translate user interface events displayed on a results page into a business actions defined in a service interface which, in one embodiment, may be service beans 542. That is, action controllers 534 are event managers that execute search related business logic by calling service beans 542. Service interface 542 is a component or components in which business logic is effectively stored. Service interface 542 may be registered against a search category. In one embodiment, service interface 542 include three types of services, namely list services, entity services, and action services. Such services may be considered to be a toolkit. List services may be performed on a list of entities defined by a search category, and may be identified by a list of primary keys. Entity services may be performed on a particular entity of a business object. For example, results of a query may be presented to a user as a list of results that are each identified by a primary key. Business actions or action services that may be performed on these results may include, but are not limited to, saving a result, applying for a particular job if the results are job opportunities, and sorting the results based on a particular attribute. Action services are, in one embodiment, services that may be linked to user interface actions.

User interface templates 538 are snippets, e.g., hypertext markup language (HTML) snippets, that enable service beans 542 to be called by action controllers 534. By way of example, templates 538 may be used to customize a user interface substantially without altering code associated with user interface renderer 532. As will be described below with respect to FIG. 5B, user interface templates 538 may be utilized to render a dynamic HTML (DHTML) user interface for search results or action forms.

Architecture 500 may also be associated with an applications security module 546 and an internationalization module 550. Applications security module 546 interacts with toolkits, e.g., service interface or service beans 542, to effectively enforce security requirements associated with architecture 500. Applications security module 546 may define security policy based on search categories, and may be used by components of architecture 500 that include, but are not limited to, index engine 508 and query engine 510. Internationalization module 550 may be used to allow searches to be available in a plurality of languages.

Figure 5B:
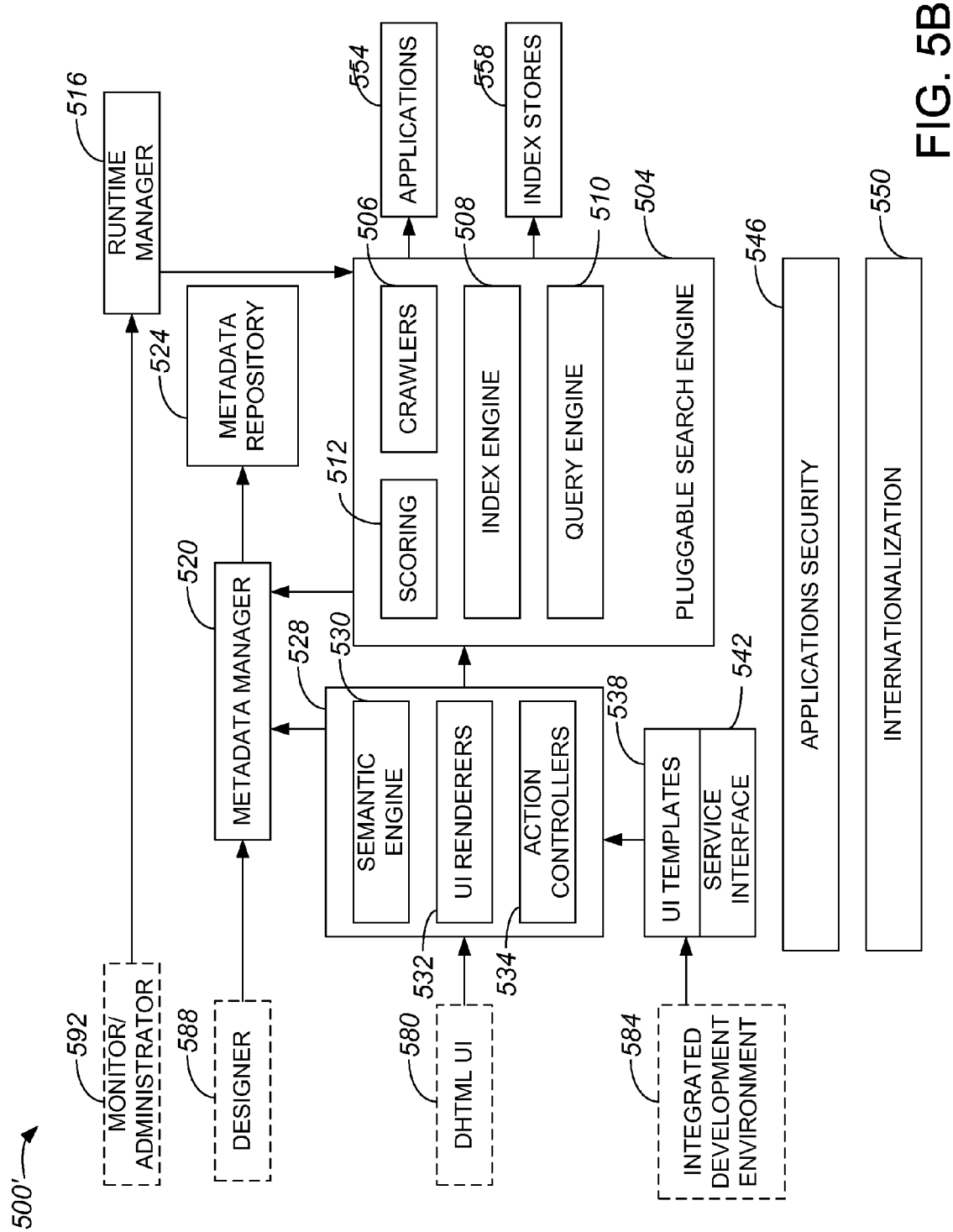
FIG. 5B is a block diagram representation of a software architecture, i.e., software architecture 500 of FIG. 5A, as shown with extensions that may also be included in the software architecture in accordance with an embodiment of the present invention.

Various external components may be interfaced with architecture 500. As shown in FIG. 5B, an overall architecture 500 may include a monitor or administrator 592 that uses runtime manager 516 to manage a search at runtime. A designer or developer 588 may define search categories that are stored in metadata repository 524. Search categories encapsulate artifacts that search engine 504 may use to perform a search, and may include, but are not limited to, categories such as customers and tasks. A DHTML user interface 580 provides user input to user interface renderers 532. A tool 584 such as JDeveloper, which is available from Oracle Corporation of Redwood Shores, Calif. provides an integrated development environment for building service oriented applications. That is, tool 584 allows user interface templates 538 and service interface 542 to be created and modified.

Figure 6:
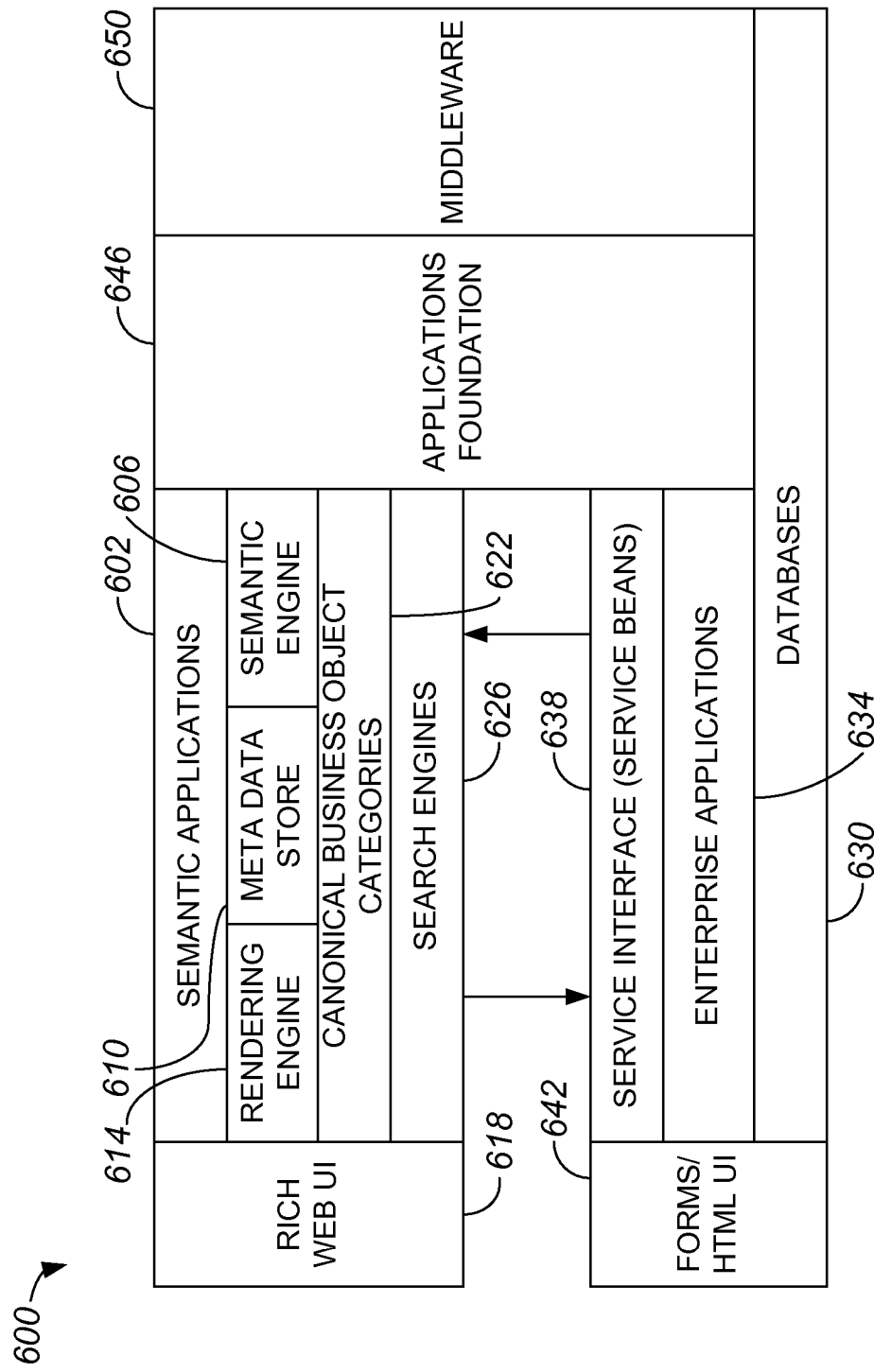
FIG. 6 is a diagrammatic representation of a search based application that interfaces with transactional applications in accordance with an embodiment of the present invention.

As previously mentioned, the ability to allow an end user to enter a natural language search string to search applications increases the usability of a search based application framework. The use of a semantic engine and semantic applications, as a part of an overall interface that allows search engines to be incorporated for use with enterprise applications, provides functionality to an overall architecture. Referring next to FIG. 6, interfaces between search based applications and enterprise applications will be described in accordance with an embodiment of the present invention. A framework 600 includes enterprise applications 634 which, in one embodiment, may be transactional applications. Applications 634 are associated with databases 630 that store information used by applications 634. A service interface such as service beans 638 contain business logic and enable applications 634 to be accessed by a search-based application that includes semantic applications 602 and a search engine 626.

Semantic applications 602 use a rendering engine 614, a meta data store 610, and a semantic engine 606, which were described above with respect to FIG. 5A, to effectively invoke a search engine 626 to search applications 634. Canonical objects, e.g., purchase orders, are generally business objects associated with a canonical business object categories 622 that are not bound to a specific implementation. Often, certain types of taxonomies may be applied to canonical objects to form canonical business object categories 622. Semantic applications 602, which are indexed for searching and contain structured data, may be considered to act substantially in parallel with applications 634. In one embodiment, semantic applications 602 effectively wrap and describe applications 634.

A user interface 618, which may be a rich web user interface 618, allows inputs such as search strings to be made to the search based application. Rich web user interface 618 allows business actions to be readily associated with results of a query. Applications 634 are associated with a form or HTML based user interface 642 that allows results of a query to be displayed and acted upon.

Middleware 650, which may be Fusion Middleware available from Oracle Corporation of Redwood Shores, Calif. effectively aggregates management capabilities and deployment platforms into a technology platform. In general, middleware 650 enables substantially any development tools (not shown), any enterprise applications 634, and any search engines 626 to be integrated into framework 600. That is, middleware 650 allows for components of framework 600 to be readily replaced. It should be appreciated that while Middleware 650 may substantially any middleware which allows for different tools, applications, or search engines to be incorporated into framework 600 may be used. In other words, any middleware 650 which provides a platform for designing and running enterprise software may be used in lieu of Fusion Middleware.

Applications foundation 646 is arranged to enable applications to be built. That is, applications foundation 646 provides a foundation upon which applications such as transactional applications may be built, and provides an applications context within which the applications may be run. In one embodiment, applications foundation 646 provides common services that may include, but are not limited to, applications security, logging, and error handling. Generally, semantic applications 602 may be deployed on top of applications foundation 646 and may share the applications context provided in applications foundation 646.

Figure 7:
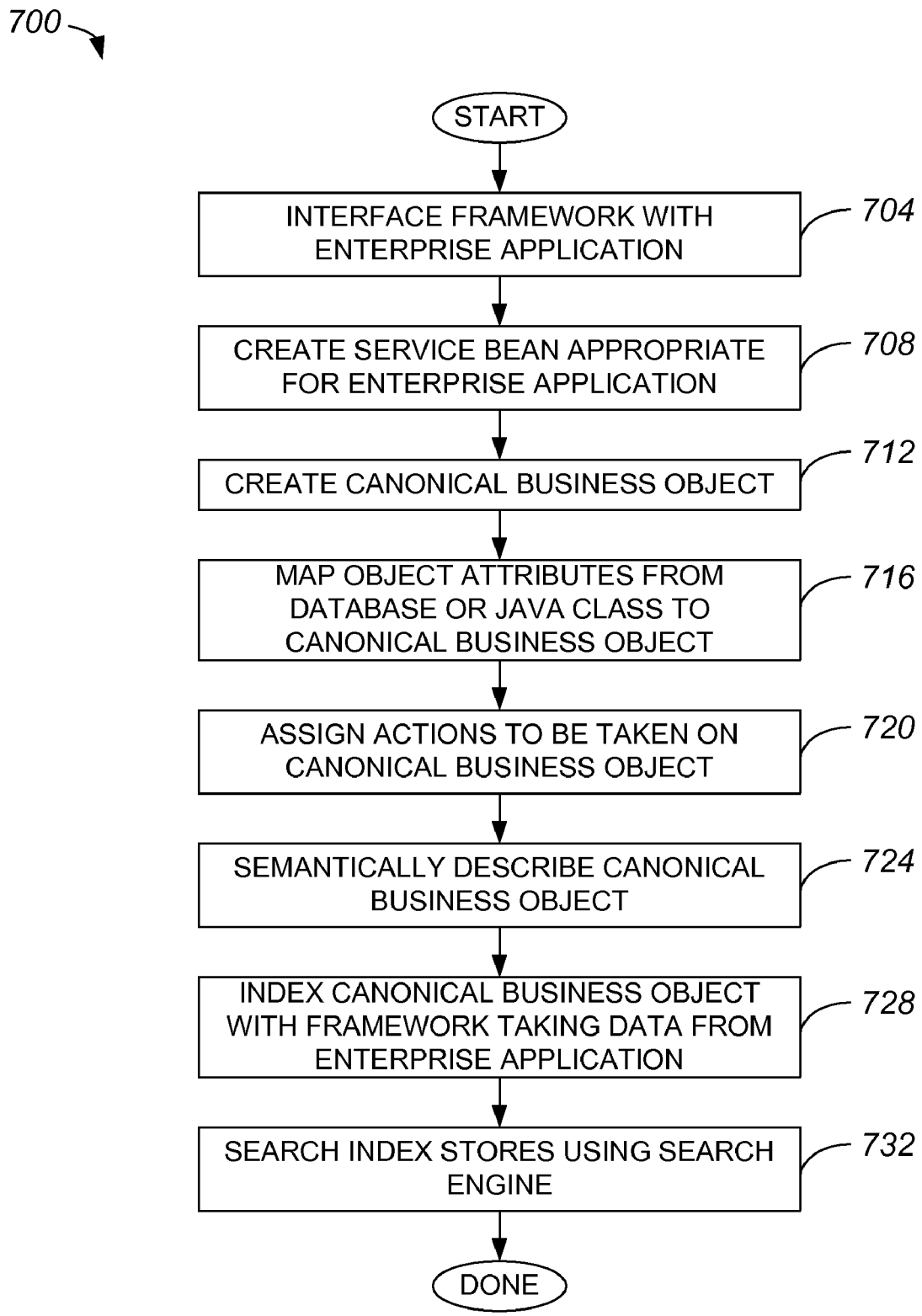
FIG. 7 is a process flow diagram which illustrates one method of integrating an application with a framework in accordance with an embodiment of the present invention.

FIG. 7 is a process flow diagram which illustrates one method of integrating an application with a framework in accordance with an embodiment of the present invention. A process 700 of integrating an application such as an enterprise application with a framework that enables searches to be performed on the application begins at step 704 in which the framework is interfaced with the enterprise application. Once the framework is interfaced with the enterprise application, a service interface or a service bean appropriate for the enterprise application is created in step 708. A service bean allows actions to be defined such that the framework may be used to access the enterprise application.

Upon creating an appropriate service interface or bean, a canonical business object is created in step 712. The canonical business object is arranged to define data, and may be stored in a database or a repository such as a metadata repository. In step 716, object attributes stored in the database or in a Java class are mapped to the canonical business object created in step 712. Actions to be taken on the canonical business object are assigned in step 720. Assigning actions may include assigning a search engine to the canonical business object.

From step 720, process flow moves to step 724 in which the canonical business object is semantically described. Then, a crawler of a search engine may be used to index the canonical business object in step 728. Indexing the canonical business object may include taking data from the enterprise application. After the canonical business object is indexed, index stores may be searched using a search engine in step 732. The semantic description of the canonical business object is used by the search engine to build a query. Once the index stores are searched, the process of integrating an enterprise application with a framework is completed.

Figure 8:
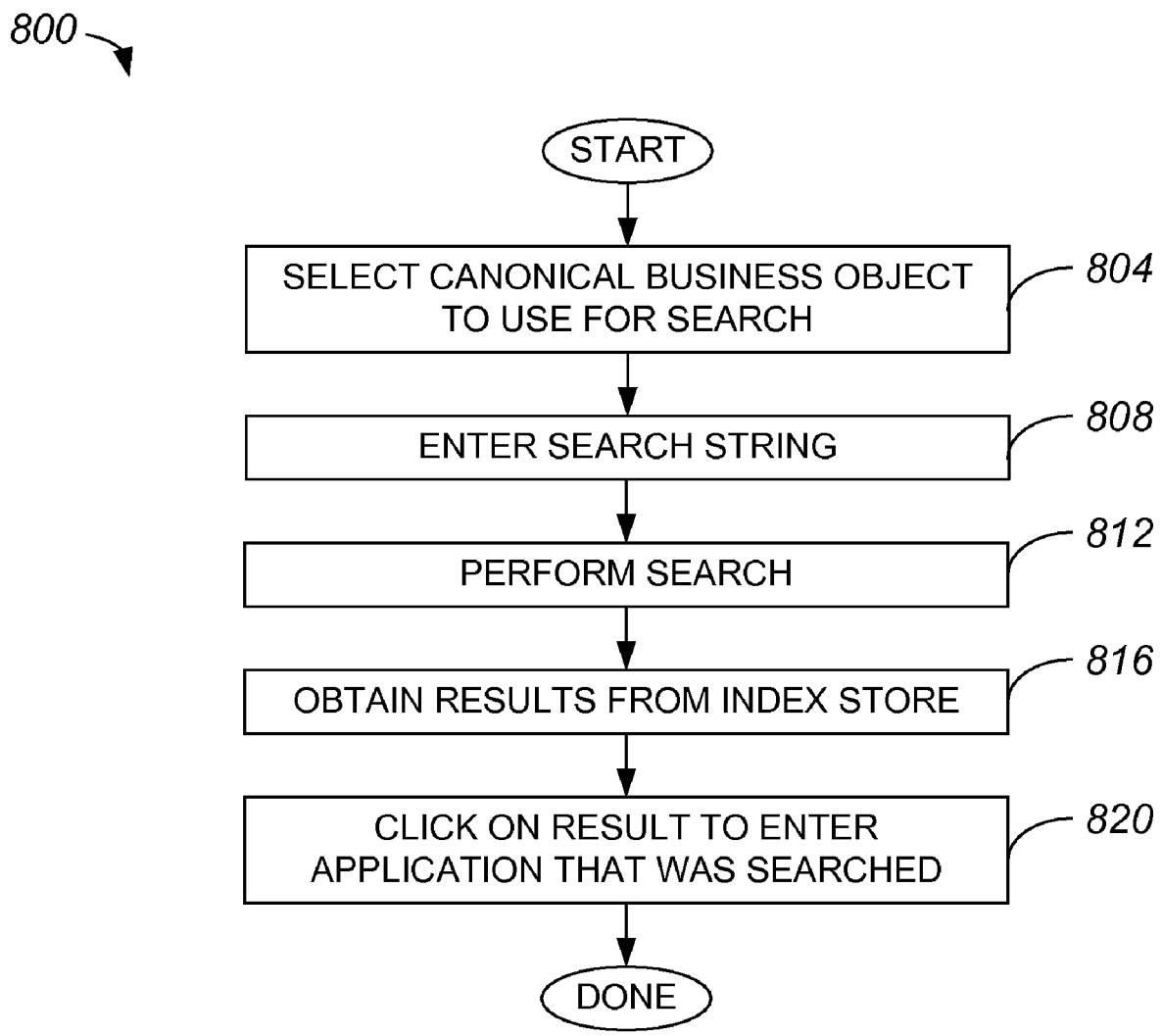
FIG. 8 is a process flow diagram which illustrates one method of processing a query in accordance with an embodiment of the present invention.

With reference to FIG. 8, the processing of a search string provided by a user will be described. FIG. 8 is a process flow diagram which illustrates one method of processing a user-provided query in accordance with an embodiment of the present invention. A process 800 of processing a user-provided query begins at step 804 in which a search category is identified. In other words, a canonical business object that is stored in a metadata repository is selected for use in a search. After the canonical business object is selected, a search string is entered in step 808. In one embodiment, a semantic engine may determine, based on a semantic definition, that a search string is related to a given category. Hence, a semantic engine may relate a particular search string to a particular canonical object. By way of example, a search string that contains the string "who employs John Doe?" may be related to canonical objects that are an employees by a semantic engine.

The search string that is entered in step 808 is typically entered by a user. Once the search string is entered, a search is performed using the search string in step 812. Performing a search includes effectively translating the search string into a format that is understood by a search engine, then translating that format into another format that is understood by an index store from which results are to be obtained.

Results of the search are obtained from an index store in step 816. It should be appreciated that the results in the index store are typically obtained from an application being searched. A result is then clicked on or otherwise selected in step 820 to provide the user with access to the application that the result is associated with. After the application is entered by the user, the process of processing a user-provided query is completed.

Figure 9:
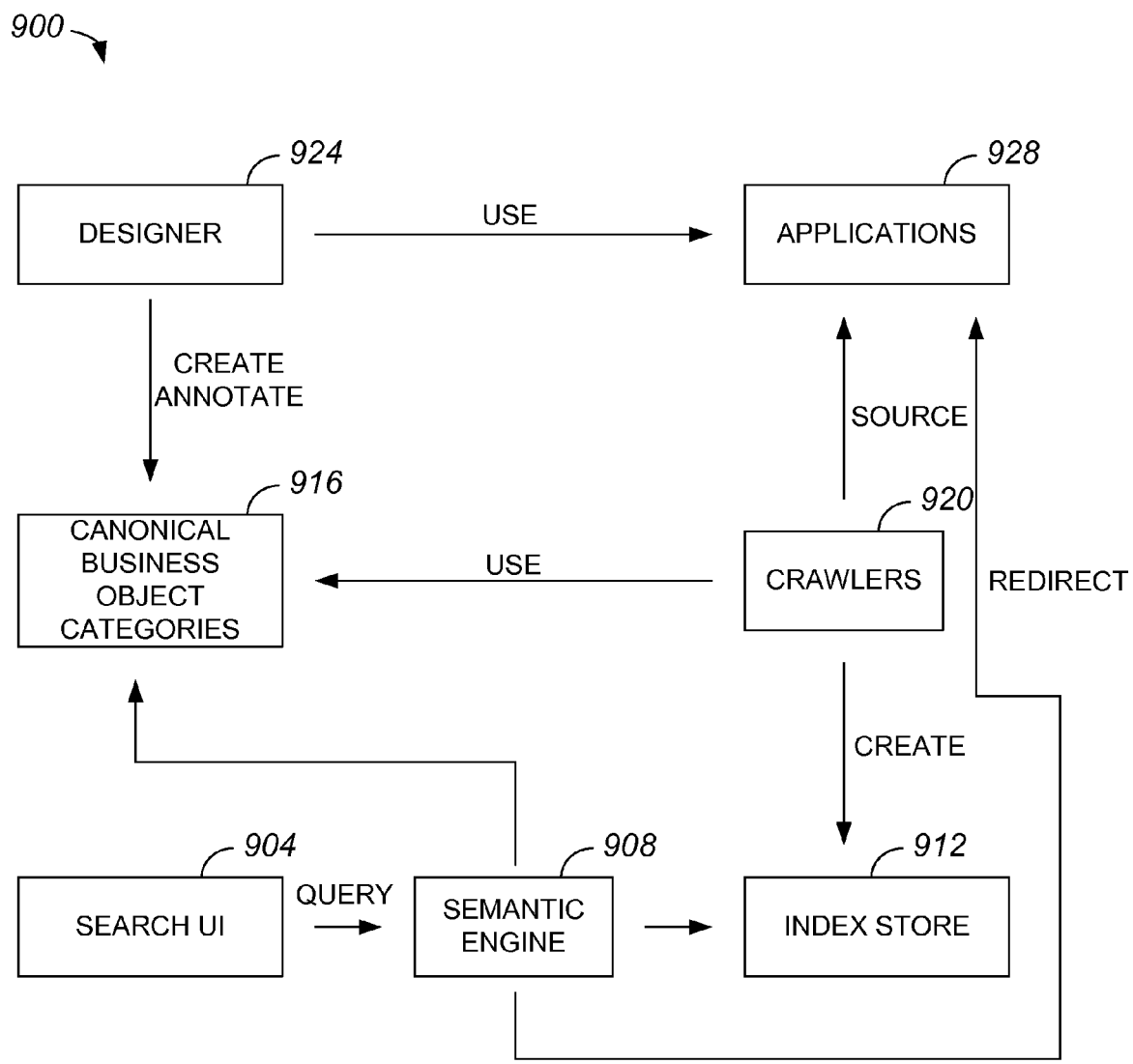
FIG. 9 is a block diagram representation of a flow that indicates actions which occur when a searchable application is interfaced into a framework and made available for searching in accordance with an embodiment of the present invention.

Referring next to FIG. 9, a process of setting up and using a search based application framework that allows transactional applications to be searched will be described in accordance with an embodiment of the present invention. A process of implementing a search based application framework begins when a designer 924 or developer inspects applications 928, e.g., transactional applications. Applications 928 may be inspected to determine what information in applications 928 are to be available for searching. Designer 924, after inspecting applications 928, creates or annotates canonical business object categories 916 that are to be available for searching. Creating canonical business object categories 916 generally entails creating canonical business objects.

Once canonical business objects are created, crawlers 920, which may be part of a pluggable search engine, indexes applications 928 to enable applications 928 to be searched. This crawling process enables crawlers 920 to use search artifacts of canonical business objects to create indexes for given canonical business object categories 916. These indexes are then stored by crawlers 920 in index store 912.

When a user wishes to search applications 928, the user may use a user interface 904 of framework 900 to enter a query, e.g., a natural language query. A semantic engine 908 searches index store 912 using canonical business object categories 916. In one embodiment, semantic engine 908 may effectively indirectly search index store 912 through a search engine (not shown). Semantic engine 908 may redirect the query to applications 928 when appropriate indexes are found using index store 912. It should be appreciated that before the query is redirected to applications 928, the query is typically converted first to a format that is understood by a search engine and then to a format that is understood by applications 928.

Figure 10:
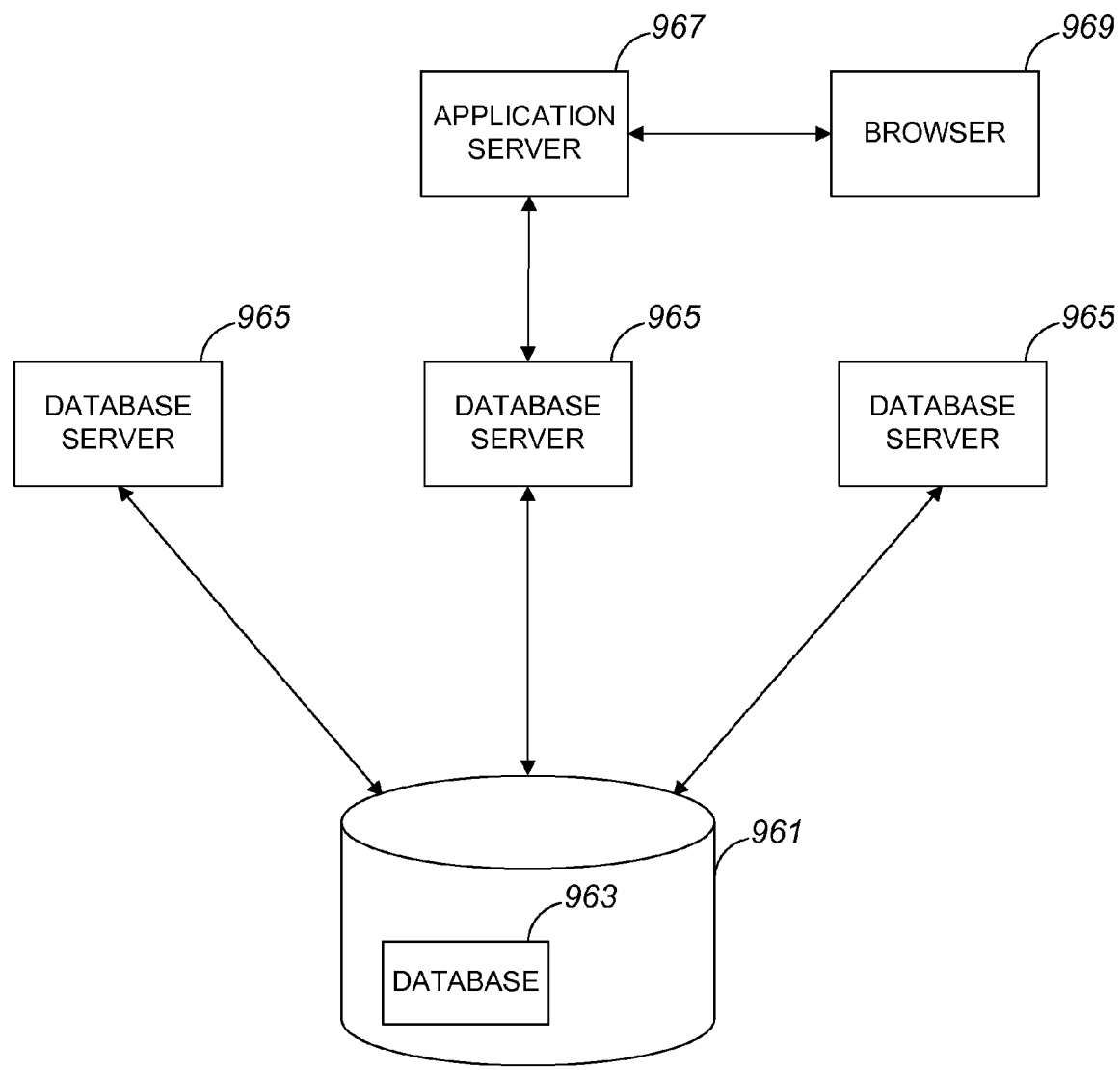
FIG. 10 is a block diagram representation of a database management system architecture.

A search based application development framework may generally be implemented with respect to a database management system. One suitable database management system architecture is the three-tiered architecture that is shown in FIG. 10. At the core of a database management system is a central storage 961 that stores a database 963 or a repository. Database 963 is typically stored on one or more hard drives, and is typically part of a larger computer system. The information may be stored on database 963 in a variety of formats with relational database management systems relying heavily on tables to store the information. Database servers 965 are instances of a program that interacts with database 963. Each instance of a database server 965 may, among other features, independently query database 963 and store information therein.

In some instances, database servers 965 may not include user friendly interfaces, such as graphical user interfaces. Accordingly, at least one application server 967 may provide the user interfaces to database servers 965. By way of example, application server 967 may be a web application server on the Internet, or any other network. Application server 967 may provide user friendly mechanisms for accessing database 963 through database servers 965. A web browser 969 may be utilized to access application server 967.

Figure 11:
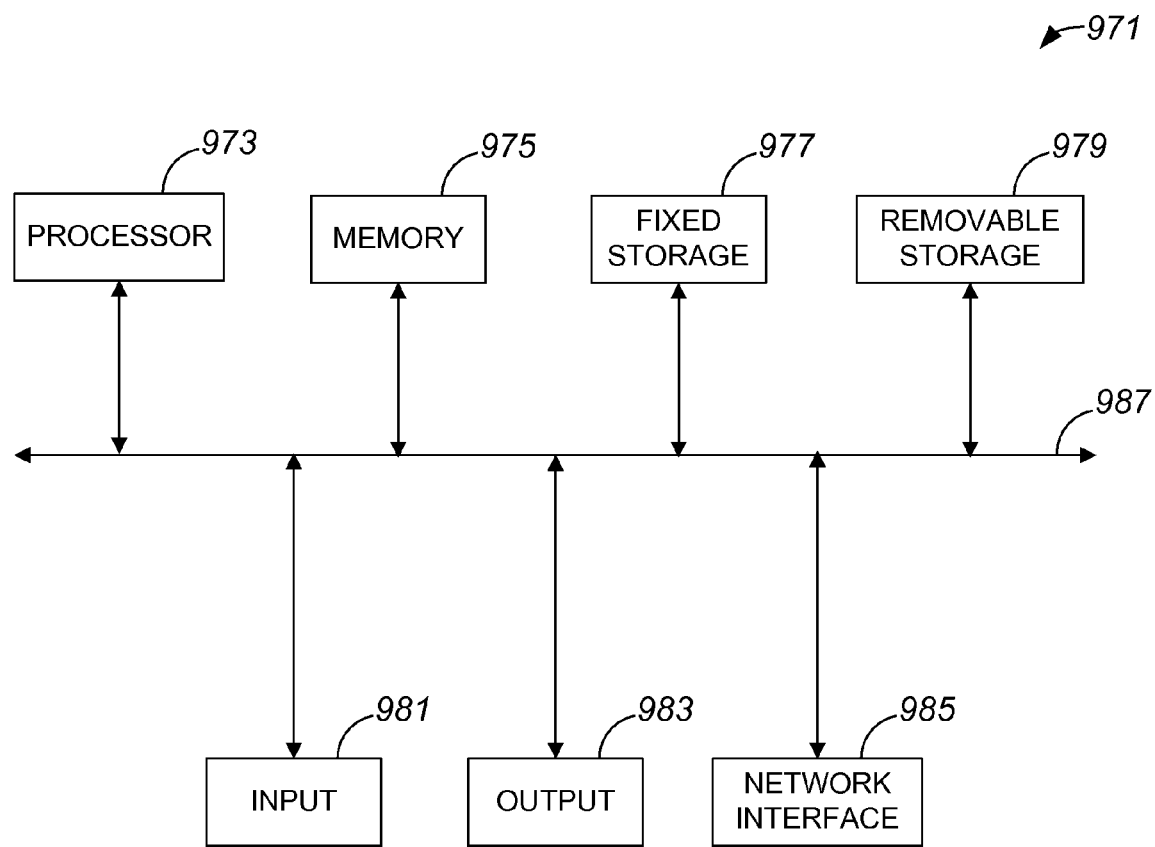
FIG. 11 is a block diagram representation of a computing system that may be utilized in association with the embodiments of the present invention.

FIG. 11 shows a block diagram of components that may be present in computer systems that implement embodiments of the invention. A computer system 971 includes a processor 973 that executes instructions from computer programs, including operating systems. Processor 973 may be utilized to allow a semantic engine, for example, to run. Although processor 973 typically has memory caches, processor 973 may utilize memory a 975 which may store instructions or computer code and data.

A fixed storage 977 may store computer programs and data. Fixed storage 977 is typically persistent, and provides more storage when compared to memory 975. A common fixed storage 977 for databases is multiple hard drives, although it should be understood that fixed storage 977 maybe be any suitable component. A removable storage 979 provides mobility to computer programs and/or data that are stored thereon. Removable storage 979 may include, but is not limited to, floppy disks, tape, CD/ROM, DVD, flash memory devices, and the like.

Memory 973, fixed 977 and removable storage 979 provide examples of computer readable storage media that can be utilized to store and retrieve computer programs incorporating computer codes or code devices that implement the invention, data for use with the invention, and the like. An input device 981 allows a user to interface with computer system 971. Input device 981 may be a keyboard, a mouse, buttons, dials, or any other suitable input mechanism. An output device 983 generally allows system 971 to provide output to the user. Output device 983 may include, but is not limited to, devices such as monitors, display screens, LEDs, printers, or substantially any other output mechanism.

A network interface 985 typically allows system 971 to interface with a network to which it is connected. The system bus architecture of computer system 971 is represented by arrows 987. The components shown in FIG. 11 may be found in many computer systems. However, components may be added, deleted, and combined without departing from the spirit or the scope of the present invention. For example, fixed storage 977 may be a file server that is accessed through a network connection. Thus, FIG. 11 is for illustration purposes and not limitation.

Although only a few embodiments of the present invention have been described, it should be understood that the present invention may be embodied in many other specific forms without departing from the spirit or the scope of the present invention. By way of example, a search engine has been described as being pluggable with respect to an architecture of the present invention. However, a search engine may instead be a fixed or integrated part of the architecture.

While enterprise applications that are transactional applications have generally been described as suitable for being searched using a search based application framework, applications that are searched are not limited to being transactional enterprise applications. For example, an enterprise application that is not transactional application or a transactional application that is not an enterprise application may be searched.

Filters may be included in a framework to enable more results obtained in response to a search or a query to be further searched. For instance, if an initial query searched for open job positions in the field of database development, a filter may be applied to remove all job positions that are associated with a particular company, or to specify a particular base salary.

Components of a framework have generally been described as being software modules, or modules created using computer code devices. In one embodiment, components of a framework may be implemented as a combination of hardware modules and software modules, or even as substantially only hardware modules without departing from the spirit or the scope of the present invention.

A service interface such as a service bean has generally been described as being included in an architecture that supports a search based application framework. As described above, service beans represent actions that are to be applied on an object. Other mechanisms which define and provide services may be implemented in lieu of service beans. Alternatively, it should be appreciated that for an embodiment in which actions using an application from which a search result is obtained are not desired, service beans may not necessarily be included in a search based application framework.

Searches may be saved such that once a user performs a search using a search based application, the text entered to perform the search is saved for future access. Similarly, the results of a search may be saved to enable the user to easily access the search results without performing another search.

In general, the steps associated with methods of the present invention may vary widely. Steps may be added, removed, altered, combined, and reordered without departing from the spirit or the scope of the present invention. By way of example, though clicking on a result to enter an application that was searched has been described as an action that may occur when responses to a query are obtained, actions that are taken on a set of responses may vary widely. In one embodiment, custom actions assigned to a corresponding canonical business object. Custom actions may include, but are not limited to, actions for a semantic application or a transition to transactional applications upon which a semantic application is bound. Therefore, the present examples are to be considered as illustrative and not restrictive, and the invention is not to be limited to the details given herein, but may be modified within the scope of the appended claims.

What is claimed is:

1. A method for enabling at least one transactional application to search, the method comprising:
creating a first canonical object associated with a first transactional application;
creating a second canonical object associated with a second transactional application;
indexing first and second data associated with the first transactional application to enable the first transactional application to be searched, wherein the first and second data is received via the first transactional application, and the first data is different from the second data;
indexing third data associated with the second transactional application to enable the second transactional application to be searched, wherein the third data is received via the second transactional application, the first and second data is not accessible to the second transactional application, and the third data is not accessible to the first transactional application;
creating an index store using information associated with the first and second canonical objects, wherein the index store is associated with the indexed first, second, and third data;
interfacing a semantic engine with the index store;
providing a query to the semantic engine, the query having a first format, wherein the semantic engine is arranged to translate the query from the first format into a second format, the second format being associated with a search engine;
accessing the index store using the search engine;
determining if a result associated with the query having the second format is indicated in the index store; and
displaying a result associated with the query.

2. The method of claim 1 comprising storing the first canonical object in a metadata store.

3. The method of claim 1 wherein indexing the data comprises using crawlers to crawl the first and second transactional applications to obtain the first and third data.

4. The method of claim 1 comprising interfacing a search engine with the semantic engine and the first transactional application.

5. The method of claim 4 wherein interfacing the search engine with the semantic engine and the first transactional application comprises providing a scorer, a crawler, an index engine, and a query engine to the search engine.

6. The method of claim 5 wherein the index engine indexes a searchable document constructed by the crawler and is arranged to expose the index store to the query engine.

7. The method of claim 1 comprising:
via a search user interface, receiving at the semantic engine a search string for querying of the first and second transactional applications;
displaying a listing of search results for the first and second transactional applications;
displaying a link associated with the search results for the first transactional application that invokes the first transactional application; and
displaying a link associated with the search results for the second transactional application that invokes the second transactional application.

8. The method of claim 7 comprising:
at the semantic engine, performing the querying of the first and second transactional applications using index store and without accessing the first and second transactional applications.

9. The method of claim 1 comprising:
displaying an action button associated with the search results for the first transactional application that invokes a third application, different from the first and second transactional applications.

10. The method of claim 1 wherein the first data is contained in the first transactional application.

11. The method of claim 1 wherein the first format is a natural language format not understandable by the search engine.

12. The method of claim 1 comprising:
obtaining information associated with the result from the first transactional application; and
displaying the information, wherein displaying the information includes allowing an action relative to the information to be performed.

13. The method of claim 1 comprising:
translating the second format into a third format associated with the index store, wherein results of the query are obtained from the index store; and
displaying the result of the query via a user interface, wherein selecting the result provides a user with access to the transactional application associated with the result.

14. The method of claim 1 comprising:
providing a user interface on a display screen, wherein the display screen comprises a search area and a results area, wherein the query having a first format and not understandable by the search engine is entered and displayed in the search area;
receiving the query having the second format to perform a search, wherein performing the search includes utilizing the index store containing information associated with the first and second transactional application;

displaying in the results area a list of results after the search is performed;

when a result is associated with the first transactional application, displaying the results for the first transactional application and a first associated action button;

when a result is associated with the second transactional application, displaying the results for the second transactional application and a second associated action button;

invoking a third transactional application associated with the first transactional application when the first associated action button is selected; and invoking a fourth transactional application associated with the second transactional application when the second associated action button is selected.

15. The method of claim 14 wherein the query is a search string associated with different search categories, and wherein the object categories are stored in a metadata repository.

16. The method of claim 15 further comprising a first scorer and a second scorer that provides rating functionality and information relating to how much of a match the particular result is to the query, wherein the first scorer is associated with the first search category and the second scorer is associated with the second search category.

17. The method of claim 14 wherein the displaying in the results area a list of results comprises identifying each result by a primary key.

18. The method of claim 14 wherein the query having a first format is entered by a user using a keyboard input.

19. The method of claim 14 wherein the query having a first format is entered using pull-down or pop-up menus.

20. The method of claim 14 wherein the third transactional application is different from the first transactional application.

21. An apparatus for enabling at least one transactional application to be searched, the apparatus comprising:

means for creating a canonical object associated with the at least a first and second transactional applications;

means for indexing first and second data associated with the first transactional application and third data associated with the second transactional application, wherein the first transactional application has direct access to the first and second data but not the third data, and the second transactional application has direct access to the third data but not the first or second data, and the first data is different from the second data;

means for creating an index store using information associated with the canonical object, wherein the index store is associated with the indexed first, second, and third data;

means for interfacing a semantic engine with the index store;

means for determining if a result associated with the query having a first format is indicated in the index store;

means for translating the query from the first format into a second format, the second format being associated with the first transactional application if it is determined that the result associated with the query having the first format is indicated in the index store;

means for accessing the first transactional application using the query having the second format if it is determined that the result associated with the query having the first format is indicated in the index store;

means for accessing the index store using a search engine; and means for displaying a result associated with the query.

22. The apparatus of claim 21 comprising:

means for providing the query to the semantic engine, the query having a third format, wherein the semantic engine is arranged to translate the query from the third format into the first format, the first format being associated with the search engine.

23. A computer program product embodied in a computer readable storage medium having executable instructions that when executed by a computer causes the computer to enable at least one transactional application to be searched, the computer program product comprising:

code devices that cause a canonical object associated with the at least one transactional application to be created;

code devices that cause data associated with the at least one transactional application to be indexed;

code devices that cause an index store using information associated with the canonical object to be created, wherein the index store is associated with the indexed data;

code devices that cause a semantic engine to be interfaced with the index store;

code devices that cause a query to the semantic engine to be provided, the query having a first format, wherein the semantic engine is arranged to translate the query from the first format into a second format, the second format being associated with a search engine;

code devices that cause determination of whether results associated with the query having the second format are indicated in the index store;

code devices that cause display of search results provided by the semantic engine including links to open a new display window separate from the search results; and a computer-readable storage medium that stores the code devices.

24. A framework embodied in a computer-readable storage medium for enabling at least one application to be searched, the framework comprising:

an interface, the interface being arranged to translate a query from a first format to a query of a second format, the interface further being arranged to be associated with a canonical business object associated with the at least one application;

a search engine, the search engine being arranged to search the at least one application in response to the query of the second format;

an index store, wherein a result of the query of the second format is indicated in the index store and is accessed using the search engine;

a runtime manager, the runtime manager being arranged to interface the search engine with the at least one application, wherein the interface is further arranged to cause the result of the query of the second format to be displayed and a link to invoke the at least one application to be displayed; and a display device, the display device being arranged to display a result associated with the query.

25. The framework of claim 24 wherein the at least one application is at least one selected from the group consisting of an enterprise application and a transactional application.

26. The framework of claim 24 wherein the interface includes a semantic engine.

27. The framework of claim 24 wherein the first format is a natural language format.

28. The framework of claim 24 wherein the search engine includes a query engine, an index engine, a scorer, and a crawler.

29. The framework of claim 28 wherein the crawler is arranged to index the at least one application and to cooperate with the index engine to create the index store, the index store being arranged to access by the interface and by the search engine.

30. The framework of claim 24 further including a metadata arrangement, the metadata arrangement being arranged to store the canonical business object.

31. The framework of claim 24 further including at least one service interface, the service interface being arranged to define at least one business action associated with a result of the query of the second format.

32. The framework of claim 31 wherein the at least one business action is arranged to be invoked using the display of the result of the query of the second format.

33. A method for processing a query, the query being arranged to request information associated with an application, the method comprising:
  selecting a canonical business object, the canonical business object being associated with the application;
  performing a search using information associated with the query, the search being associated with the canonical business object, wherein performing the search includes utilizing an index store containing information associated with the application;
  obtaining a result of the search from the index store;
  displaying a link associated with the result of the search, wherein when a user selects the link, the link invokes the application; and
  displaying the results of the search from the index store without invoking the application,
  wherein the result of the search is displayed, and accessing the application using the result of the search includes accessing the application using the displayed result.

34. The method of claim 33 comprising:
  entering the information into a user interface display, wherein obtaining the result of the search from the index store includes displaying the result in the user interface display.

35. A computer program product embodied in a computer readable storage medium having executable instructions, the executable instructions when executed by a computer causes processing of a query, the query being arranged to request information associated with a first application, the computer program product comprising:
  computer code to select a canonical business object, the canonical business object being associated with the first application;
  computer code to perform a search using information associated with the query, the search being associated with the canonical business object, wherein the computer code to perform the search includes computer code to utilize an index store containing information associated with the first application;
  computer code to obtain a result of the search from the index store;
  computer code that causes display of an action button associated with the result of the search, wherein when a user selects the action button, the action button invokes a second application, different from the first application;
  computer code to access the first application using the result of the search;
  computer code to receive at the semantic engine a search string for querying of the first and second transactional applications via a search user interface;
  computer code to display a listing of search results for the first and second transactional applications;
  computer code to display a link associated with the search results for the first transactional application that invokes the first transactional application;
  computer code to display a link associated with the search results for the second transactional application that invokes the second transactional application; and
  a computer-readable storage medium that stores the computer codes.

* * * * *

UNITED STATES PATENT AND TRADEMARK OFFICE
CERTIFICATE OF CORRECTION

| | | |
|---|---|---|
| PATENT NO. | : 7,689,580 B2 | |
| APPLICATION NO. | : 11/277585 | |
| DATED | : March 30, 2010 | |
| INVENTOR(S) | : Anping Wang et al. | |

It is certified that error appears in the above-identified patent and that said Letters Patent is hereby corrected as shown below:

In column 1, line 56, delete "requester" and insert -- requestor --, therefor.

In column 3, lines 3-13, delete "The present invention relates to a searching framework that provides a semantic interface for searching transactional applications. According to one aspect of the present invention, a method for enabling at least one transactional application to be searched includes creating a canonical object associated with the transactional application and indexing data associated with the transaction application. The method also includes creating an index store using information associated with the canonical object. The index store is associated with the indexed data. Finally, a semantic engine is interfaced with the index store." and insert -- The present invention relates to a searching framework that provides a semantic interface for searching transactional applications. According to one aspect of the present invention, a method for enabling at least one transactional application to be searched includes creating a canonical object associated with the transactional application and indexing data associated with the transaction application. The method also includes creating an index store using information associated with the canonical object. The index store is associated with the indexed data. Finally, a semantic engine is interfaced with the index store. --

In column 12, line 22, delete "fixed" and insert -- fixed storage --, therefor.

In column 12, line 23, delete "can" and insert -- may --, therefor.

In column 13, line 40, in Claim 1, delete "search," and insert -- be searched, --, therefor.

In column 14, line 9, in Claim 4, delete "a" and insert -- the --, therefor.

In column 15, line 47, in Claim 21, after "data," delete "and".

In column 15, line 57, in Claim 21, delete "the" and insert -- a --, therefor.

Signed and Sealed this
Fifteenth Day of March, 2011

David J. Kappos
*Director of the United States Patent and Trademark Office*

CERTIFICATE OF CORRECTION (continued)
U.S. Pat. No. 7,689,580 B2

In column 16, lines 10-11, in Claim 23, delete "computer readable" and insert -- computer-readable --, therefor.

In column 17, line 8, in Claim 29, delete "access" and insert -- be accessed --, therefor.

In column 18, lines 6-7, in Claim 35, delete "computer readable" and insert -- computer-readable --, therefor.